(12) United States Patent
Blackburn et al.

(10) Patent No.: US 12,104,058 B2
(45) Date of Patent: Oct. 1, 2024

(54) STABILIZED FLEXIBLE THERMOPLASTIC COMPOSITION AND PRODUCTS FORMED THEREFROM

(71) Applicant: Ticona LLC, Florence, KY (US)

(72) Inventors: Emily C. Blackburn, Fort Mitchell, KY (US); Rong Luo, Florence, KY (US); Xinyu Zhao, Cincinnati, OH (US); Jared Kindt, Union, KY (US); Xiaoyan Tu, Florence, KY (US)

(73) Assignee: Ticona LLC, Florence, KY (US)

( * ) Notice: Subject to any disclaimer, the term of this patent is extended or adjusted under 35 U.S.C. 154(b) by 1075 days.

(21) Appl. No.: 14/963,285

(22) Filed: Dec. 9, 2015

(65) Prior Publication Data

US 2016/0168382 A1 Jun. 16, 2016

Related U.S. Application Data

(60) Provisional application No. 62/090,549, filed on Dec. 11, 2014.

(51) Int. Cl.
*C08L 81/04* (2006.01)
*H01B 3/00* (2006.01)
*H01B 3/30* (2006.01)

(52) U.S. Cl.
CPC .............. *C08L 81/04* (2013.01); *H01B 3/002* (2013.01); *H01B 3/301* (2013.01)

(58) Field of Classification Search
CPC ................................ C08L 81/04; H01B 3/002
See application file for complete search history.

(56) References Cited

U.S. PATENT DOCUMENTS

| 3,354,129 | A | 11/1967 | Edmonds, Jr. et al. |
| 3,919,177 | A | 11/1975 | Campbell |
| 4,337,329 | A | 6/1982 | Kubo et al. |
| 4,368,321 | A | 1/1983 | Sherk et al. |
| 4,371,671 | A | 2/1983 | Anderson |
| 4,384,081 | A | 5/1983 | Kubo et al. |
| 4,452,951 | A | 6/1984 | Kubo et al. |

(Continued)

FOREIGN PATENT DOCUMENTS

| CA | 2 032 370 | 6/1991 |
| EP | 0 900 650 A | 3/1999 |

(Continued)

OTHER PUBLICATIONS

Science Direct article on "Heat Stabiliser", obtained on Mar. 2022 https://www.sciencedirect.com/topics/engineering/heat-stabiliser#:~:text=Heat%20stabilizers%20are%20used%20to,oxidation%20(Murphy%2C%201999).*

(Continued)

*Primary Examiner* — Holly Rickman
*Assistant Examiner* — Lisa Chau
(74) *Attorney, Agent, or Firm* — Dority & Manning, P.A.

(57) ABSTRACT

Thermoplastic compositions are described that exhibit heat stability in addition to flexibility. Methods for forming the thermoplastic compositions are also described. The compositions include a polyarylene sulfide, an impact modifier and a heat stabilizer. The composition includes the impact modifier in a relatively large amount in combination with the heat stabilizer to provide long term heat stability to the composition and products formed therefrom such as coated wires and cables.

24 Claims, 3 Drawing Sheets

(56) References Cited

U.S. PATENT DOCUMENTS

| | | | |
|---|---|---|---|
| 4,464,515 A | 8/1984 | Rempel et al. | |
| 4,503,196 A | 3/1985 | Rempel et al. | |
| 4,581,417 A | 4/1986 | Buding et al. | |
| 4,689,365 A | 8/1987 | Chacko et al. | |
| 4,778,858 A | 10/1988 | Ginnings | |
| 4,814,430 A | 3/1989 | Iwasaki et al. | |
| 4,871,810 A | 10/1989 | Saltman | |
| 4,889,893 A | 12/1989 | Kobayashi et al. | |
| 5,006,605 A | 4/1991 | Mizuno et al. | |
| 5,047,465 A | 9/1991 | Averbach | |
| 5,087,666 A | 2/1992 | Yu et al. | |
| 5,149,731 A | 9/1992 | Uota et al. | |
| 5,240,973 A | 8/1993 | Katoh et al. | |
| 5,240,988 A | 8/1993 | Kohler et al. | |
| 5,248,730 A | 9/1993 | Yamao | |
| 5,270,305 A | 12/1993 | Palmer | |
| 5,380,783 A | 1/1995 | Satake et al. | |
| 5,397,839 A | 3/1995 | Patel | |
| 5,504,141 A | 4/1996 | Collard et al. | |
| 5,578,679 A | 11/1996 | Suzuki et al. | |
| 5,585,229 A | 12/1996 | Kawamoto et al. | |
| 5,589,544 A | 12/1996 | Horrion | |
| 5,625,002 A | 4/1997 | Kadoi et al. | |
| 5,652,287 A | 7/1997 | Sullivan | |
| 5,654,358 A | 8/1997 | Kadoi et al. | |
| 5,654,383 A | 8/1997 | Köhler et al. | |
| 5,668,214 A | 9/1997 | Suzuki | |
| 5,817,723 A | 10/1998 | Flexman, Jr. et al. | |
| 5,830,965 A | 11/1998 | Imaizumi et al. | |
| 5,837,758 A | 11/1998 | Brown et al. | |
| 5,840,830 A | 11/1998 | Miyahara et al. | |
| 6,001,934 A | 12/1999 | Yamanaka et al. | |
| 6,015,858 A | 1/2000 | Gornowicz | |
| 6,020,431 A * | 2/2000 | Venkataswamy | C08L 23/08 525/166 |
| 6,117,950 A | 9/2000 | Yamao et al. | |
| 6,225,416 B1 | 5/2001 | Reil et al. | |
| 6,281,286 B1 | 8/2001 | Chorvath et al. | |
| 6,362,287 B1 | 3/2002 | Chorvath et al. | |
| 6,417,293 B1 | 7/2002 | Chorvath et al. | |
| 6,538,071 B1 | 3/2003 | Fuchs | |
| 6,569,955 B1 | 5/2003 | Brewer et al. | |
| 6,569,958 B1 | 5/2003 | Gross et al. | |
| 6,608,136 B1 | 8/2003 | Dean et al. | |
| 6,649,704 B2 | 11/2003 | Brewer et al. | |
| 6,653,437 B2 | 11/2003 | Hinokimori et al. | |
| 6,657,014 B1 | 12/2003 | Mori et al. | |
| 6,699,946 B1 | 3/2004 | Lambla et al. | |
| 6,713,569 B2 | 3/2004 | Chorvath et al. | |
| 6,740,707 B2 | 5/2004 | Ono et al. | |
| 6,740,709 B2 | 5/2004 | Ono et al. | |
| 6,743,868 B2 | 6/2004 | Fournier et al. | |
| 6,849,697 B2 | 2/2005 | Lambla et al. | |
| 6,875,517 B2 | 4/2005 | Bosshammer et al. | |
| 6,888,719 B1 | 5/2005 | Janzen et al. | |
| 7,011,114 B2 | 3/2006 | Suzuki et al. | |
| 7,041,741 B2 | 5/2006 | Patel et al. | |
| 7,086,420 B2 | 8/2006 | Kabn et al. | |
| 7,208,207 B2 | 4/2007 | Ono et al. | |
| 7,442,744 B2 | 10/2008 | Tokushige et al. | |
| 7,960,473 B2 | 6/2011 | Kobayathi et al. | |
| 7,981,981 B2 | 7/2011 | Ajbani et al. | |
| 8,603,599 B2 | 12/2013 | Matsuo et al. | |
| 9,182,056 B2 | 11/2015 | Ruby et al. | |
| 9,353,893 B2 | 5/2016 | Ruby et al. | |
| 2005/0089688 A1 | 4/2005 | Mungioli et al. | |
| 2005/0171303 A1 | 8/2005 | Martin et al. | |
| 2005/0208248 A1 | 9/2005 | Ho et al. | |
| 2006/0229417 A1 | 10/2006 | Ferrate et al. | |
| 2009/0306309 A1 * | 12/2009 | Ishio | C08L 81/02 525/519 |
| 2010/0004375 A1 | 1/2010 | Lalgudi et al. | |
| 2010/0029819 A1 | 2/2010 | Palmer et al. | |
| 2010/0048777 A1 | 2/2010 | Kodama et al. | |
| 2010/0317753 A1 | 12/2010 | Keefe et al. | |
| 2011/0287201 A1 | 11/2011 | Abe et al. | |
| 2012/0037397 A1 | 2/2012 | Mhetar | |
| 2013/0090416 A1 * | 4/2013 | Zhao | C08L 67/03 524/127 |
| 2013/0269977 A1 | 10/2013 | Luo et al. | |
| 2013/0273281 A1 * | 10/2013 | Luo | C08L 81/04 428/35.7 |
| 2013/0273286 A1 | 10/2013 | Luo et al. | |
| 2013/0273287 A1 | 10/2013 | Luo et al. | |
| 2013/0273288 A1 | 10/2013 | Luo et al. | |
| 2013/0273289 A1 | 10/2013 | Luo et al. | |
| 2013/0273290 A1 * | 10/2013 | Luo | F16L 11/00 428/36.92 |
| 2013/0291993 A1 | 11/2013 | Ruby et al. | |
| 2014/0316041 A1 | 10/2014 | Mehta | |
| 2015/0064437 A1 | 3/2015 | Luo et al. | |
| 2015/0072093 A1 | 3/2015 | Zhang et al. | |
| 2015/0175787 A1 * | 6/2015 | Zia | C08L 23/06 524/506 |
| 2016/0109040 A1 | 4/2016 | Ruby et al. | |

FOREIGN PATENT DOCUMENTS

| | | |
|---|---|---|
| EP | 2 239 135 | 10/2010 |
| EP | 2 418 255 A1 | 2/2012 |
| GB | 1 558 491 | 1/1980 |
| JP | 58067752 A * | 4/1983 |
| WO | WO 91/18055 | 11/1991 |
| WO | WO 94/16018 | 7/1994 |

OTHER PUBLICATIONS

Ryan, Kevin J., et al. "Ultra-High-Molecular-Weight Functional Siloxane Additives in Polymers. Effects on Processing and Properties." Journal of Vinyl and Additive Technology, vol. 6, No. 1, 2000, pp. 7-19.*

Abstract of Chinese Patent No. CN 1049508, Feb. 27, 1991, 1 page.
Abstract of French Patent No. 2617176, Dec. 30, 1988, 1 page.
Abstract of Japanese Patent No. JPH0665376, Mar. 8, 1994, 1 page.
Abstract of Japanese Patent No. JPH0959514, Mar. 4, 1997, 1 page.
Abstract of Japanese Patent No. JPH11124476, May 11, 1999, 1 page.
Abstract of Japanese Patent No. JP2001115020, Apr. 24, 2001, 1 page.
Abstract of Japanese Patent No. JP2001279097, Oct. 10, 2001, 1 page.
Abstract of Japanese Patent No. JP2004300270, Oct. 28, 2004, 1 page.
Abstract of Japanese Patent No. JP2007169550, Jul. 5, 2007, 1 page.
Abstract of Japanese Patent No. JP2011020401, Feb. 3, 2011, 1 page.
Machine Translation of Japanese Patent No. JP3618018B, Feb. 9, 2005, 15 pages.
Machine Translation of Japanese Patent No. JP3889122B, Mar. 7, 2007, 13 pages.
Machine Translation of Japanese Patent No. JP4235893B, Mar. 11, 2009, 13 pages.
Machine Translation of Japanese Patent No. JP4552434B, Sep. 29, 2010, 15 pages.
Machine Translation of Japanese Patent No. JP4600015B, Dec. 15, 2010, 22 pages.
Machine Translation of Japanese Patent No. JP4600016B, Dec. 15, 2010, 22 pages.
Machine Translation of Japanese Patent No. JP5029881B, Sep. 19, 2012, 33 pages.
Machine Translation of Japanese Patent No. JP5051428B, Oct. 17, 2012, 16 pages.
Chen et al., "Preparation of epoxy-modified polyethylene by graft extrusion and its applications to polyphenylene sulfide alloys as a compatibilizer," Reactive & Functional Polymers, vol. 682008, pp. 1307-1313.
Tang et al., "Toughening and Compatibilization of Polyphenylene Sulfide/Nylon 66 Blends with SEBS and Maleic Anhydride Grafted SEBS Triblock Copolymers," Journal of Applied Polymer Science, vol. 106, 2007, pp. 2648-2655.

(56) References Cited

OTHER PUBLICATIONS

International Search Report and Written Opinion for PCT/OS2015/064451 dated Feb. 18, 2016, 8 pages.

* cited by examiner

STABILIZED FLEXIBLE THERMOPLASTIC COMPOSITION AND PRODUCTS FORMED THEREFROM

RELATED APPLICATIONS

The present application claims priority to U.S. Provisional Application Ser. No. 62/090,549, filed on Dec. 11, 2014, which is incorporated herein in its entirety by reference thereto.

BACKGROUND OF THE INVENTION

Polyarylene sulfides are high-performance polymers that may withstand high thermal, chemical, and mechanical stresses and are beneficially utilized in a wide variety of applications. Thermoplastic compositions that incorporate polyarylene sulfides and exhibit flexibility in addition to flame resistance are of significant commercial interest.

Thermoplastic compositions including blends of polyarylene sulfides with impact modifying additives have been developed to improve the flexibility of the compositions. Unfortunately, the combination of polyarylene sulfides with elastomeric polymers useful for the desired increase of flexibility also leads to a loss in stability, particularly in applications in which the compositions are utilized in applications in which the materials can be subjected to long term increased temperatures, such as wire and cable coverings.

In view of the above, a need exists for a thermoplastic composition that is both flexible and stable over long term use. A need also exists for a stable flexible composition for incorporation into products, such as for use in wire and cable coverings.

SUMMARY OF THE INVENTION

Disclosed in one embodiment is a thermoplastic composition that includes a polyarylene sulfide, an impact modifier, and a heat stabilizer. More specifically, the thermoplastic composition can include the impact modifier in an amount that is greater than 15% by weight of the composition. The thermoplastic composition exhibits excellent long term heat stability and good flexibility. For instance, the thermoplastic composition can exhibit a tensile modulus of about 3,000 megapascals (MPa) or less as determined according to ISO Test No. 527 at a temperature of 23° C. and a test speed of 50 millimeters per minute. In addition, the thermoplastic composition can exhibit a strain at break of greater than about 25% following 1500 hours of heat treatment at 165° C.

Also disclosed are products that can beneficially incorporate the thermoplastic composition including, without limitation, sheathed cables and wires.

BRIEF DESCRIPTION OF THE FIGURES

The present disclosure may be better understood with reference to the following figures.

Repeat use of reference characters in the present specification and drawings is intended to represent the same or analogous features or elements of the present invention.

DETAILED DESCRIPTION

It is to be understood by one of ordinary skill in the art that the present discussion is a description of exemplary embodiments only, and is not intended as limiting the broader aspects of the present disclosure.

The present disclosure is generally directed to thermoplastic compositions that exhibit excellent strength and flexibility characteristics as well as long term stability under increased temperature. Thus, the thermoplastic compositions can maintain good physical characteristics and in particular flexibility even when utilized in high temperature applications such as for sheathing of wires and cables.

The thermoplastic composition can be formed according to a melt processing technique that includes combining a polyarylene sulfide with an impact modifier and a heat stabilizer. More specifically, the thermoplastic composition can include the impact modifier in a relatively high add-in amount, for instance greater than 15% by weight of the composition. Without wishing to be bound to any particular theory, it is believed that by use of a high add-in level of the impact modifier, the impact modifier and the heat stabilizer can provide a synergistic combination to provide excellent heat stability to the thermoplastic composition.

In one embodiment, one or more components of the thermoplastic composition can be crosslinked. For instance, the impact modifier can be crosslinked. The impact modifier can be crosslinked to itself and/or to the polyarylene sulfide as well as to other components of the thermoplastic composition. For instance, the polyarylene sulfide can be processed to include reactive functional groups that can crosslink with the impact modifier. To provide further improvements to the thermoplastic composition, the composition can be formed to include other additives such as organic siloxanes, fillers, lubricants, colorants, etc. according to standard practice.

The high strength and flexibility characteristics of the thermoplastic composition can be evident by examination of the tensile, and/or impact properties of the materials. For instance, the thermoplastic composition can have a tensile modulus of about 3000 MPa or less, about 2500 MPa or less, about 2250 MPa or less, or about 2000 MPa or less as determined according to ISO Test No. 527 at a temperature of 23° C. and a test speed of 50 millimeters per minute (mm/min) (technically equivalent to ASTM D623 at 23° C.).

The thermoplastic composition can exhibit very good tensile characteristics. For example, the thermoplastic composition can have a tensile strain at break of about 40% or greater, about 50% or greater, about 60% or greater, about 70% or greater, about 80% or greater, or about 90% or greater in some embodiments. In addition, the thermoplastic composition can have a tensile stress at break of about 25 megapascals (MPa) or greater, about 30 MPa or greater, about 35 MPa or greater, or about 40 MPa or greater, in some embodiments. Tensile characteristics can be determined according to ISO Test No. 527 at a temperature of 23° C. and a test speed of 50 millimeters per minute (mm/min) (technically equivalent to ASTM D623 at 23° C.).

In addition, the thermoplastic composition can maintain excellent tensile characteristics following heat aging. For instance, following heating at 180° C., the thermoplastic composition can still have a tensile break strain of about 10% or greater after 500 hours of heat treatment. Following heating at 165° C., the thermoplastic composition can still have a tensile break strain of about 25% or greater after 1500 hours of heat treatment.

The thermoplastic composition can have a notched Charpy impact strength of about 10 kJ/m$^2$ or greater, about 15 kJ/m$^2$ or greater, about 20 kJ/m$^2$ or greater, about 30 kJ/m$^2$ or greater, about 40 kJ/m$^2$ or greater, or about 50 kJ/m$^2$ or greater in some embodiments as determined according to ISO Test No. 179-1 (technically equivalent to ASTM D256, Method B) at 23° C.

The polyarylene sulfide of the thermoplastic composition may be a polyarylene thioether containing repeat units of the formula (I):

(I)

wherein Ar$^1$, Ar$^2$, Ar$^3$, and Ar$^4$ are the same or different and are arylene units of 6 to 18 carbon atoms; W, X, Y, and Z are the same or different and are bivalent linking groups selected from —SO$_2$—, —S—, —SO—, —CO—, —O—, —COO— or alkylene or alkylidene groups of 1 to 6 carbon atoms and wherein at least one of the linking groups is —S—; and n, m, i, j, k, l, o, and p are independently zero or 1, 2, 3, or 4, subject to the proviso that their sum total is not less than 2. The arylene units Ar$^1$, Ar$^2$, Ar$^3$, and Ar$^4$ may be selectively substituted or unsubstituted. Advantageous arylene systems are phenylene, biphenylene, naphthylene, anthracene and phenanthrene. The polyarylene sulfide typically includes more than about 30 mol %, more than about 50 mol %, or more than about 70 mol % arylene sulfide (—S—) units. In one embodiment the polyarylene sulfide includes at least 85 mol % sulfide linkages attached directly to two aromatic rings.

In one embodiment, the polyarylene sulfide is a polyphenylene sulfide, defined herein as containing the phenylene sulfide structure —(C$_6$H$_4$—S)$_n$— (wherein n is an integer of 1 or more) as a component thereof.

The polyarylene sulfide may be synthesized prior to forming the thermoplastic composition, though this is not a requirement of a process and in other embodiments, the polyarylene sulfide may be purchased, for instance Fortron® polyphenylene sulfides available from Ticona of Florence, Kentucky, USA can be utilized.

Synthesis techniques that may be used in making a polyarylene sulfide are generally known in the art. By way of example, a process for producing a polyarylene sulfide can include reacting a material that provides a hydrosulfide ion, e.g., an alkali metal sulfide, with a dihaloaromatic compound in an organic amide solvent.

The alkali metal sulfide can be, for example, lithium sulfide, sodium sulfide, potassium sulfide, rubidium sulfide, cesium sulfide or a mixture thereof. When the alkali metal sulfide is a hydrate or an aqueous mixture, the alkali metal sulfide can be processed according to a dehydrating operation in advance of the polymerization reaction. An alkali metal sulfide can also be generated in situ. In addition, a small amount of an alkali metal hydroxide can be included in the reaction to remove or react impurities (e.g., to change such impurities to harmless materials) such as an alkali metal polysulfide or an alkali metal thiosulfate, which may be present in a very small amount with the alkali metal sulfide.

The dihaloaromatic compound can be, without limitation, an o-dihalobenzene, m-dihalobenzene, p-dihalobenzene, dihalotoluene, dihalonaphthalene, methoxy-dihalobenzene, dihalobiphenyl, dihalobenzoic acid, dihalodiphenyl ether, dihalodiphenyl sulfone, dihalodiphenyl sulfoxide or dihalodiphenyl ketone. Dihaloaromatic compounds may be used either singly or in any combination thereof. Specific exemplary dihaloaromatic compounds can include, without limitation, p-dichlorobenzene; m-dichlorobenzene; o-dichlorobenzene; 2,5-dichlorotoluene; 1,4-dibromobenzene; 1,4-dichloronaphthalene; 1-methoxy-2,5-dichlorobenzene; 4,4'-dichlorobiphenyl; 3,5-dichlorobenzoic acid; 4,4'-dichlorodiphenyl ether; 4,4'-dichlorodiphenylsulfone; 4,4'-dichlorodiphenylsulfoxide; and 4,4'-dichlorodiphenyl ketone.

The halogen atom can be fluorine, chlorine, bromine or iodine, and 2 halogen atoms in the same dihalo-aromatic compound may be the same or different from each other. In one embodiment, o-dichlorobenzene, m-dichlorobenzene, p-dichlorobenzene or a mixture of 2 or more compounds thereof is used as the dihalo-aromatic compound.

As is known in the art, it is also possible to use a monohalo compound (not necessarily an aromatic compound) in combination with the dihaloaromatic compound in order to form end groups of the polyarylene sulfide or to regulate the polymerization reaction and/or the molecular weight of the polyarylene sulfide.

The polyarylene sulfide may be a homopolymer or may be a copolymer. By a suitable, selective combination of dihaloaromatic compounds, a polyarylene sulfide copolymer can be formed containing not less than two different units. For instance, in the case where p-dichlorobenzene is used in combination with m-dichlorobenzene or 4,4'-dichlorodiphenylsulfone, a polyarylene sulfide copolymer can be formed containing segments having the structure of formula:

and segments having the structure of formula:

or segments having the structure of formula:

In general, the amount of the dihaloaromatic compound(s) per mole of the effective amount of the charged alkali metal sulfide can generally be from 1.0 to 2.0 moles, from 1.05 to 2.0 moles, or from 1.1 to 1.7 moles. Thus, the polyarylene sulfide can include alkyl halide (generally alkyl chloride) end groups.

A process for producing the polyarylene sulfide can include carrying out the polymerization reaction in an organic amide solvent. Exemplary organic amide solvents used in a polymerization reaction can include, without limitation, N-methyl-2-pyrrolidone; N-ethyl-2-pyrrolidone; N,N-dimethylformamide; N,N-dimethylacetamide; N-methylcaprolactam; tetramethylurea; dimethylimidazolidinone; hexamethyl phosphoric acid triamide and mixtures thereof. The amount of the organic amide solvent used in the reaction can be, e.g., from 0.2 to 5 kilograms per mole (kg/mol) of the effective amount of the alkali metal sulfide.

The polymerization can be carried out by a step-wise polymerization process. The first polymerization step can include introducing the dihaloaromatic compound to a reactor, and subjecting the dihaloaromatic compound to a polymerization reaction in the presence of water at a temperature of from about 180° C. to about 235° C., or from about 200° C. to about 230° C., and continuing polymerization until the conversion rate of the dihaloaromatic compound attains to not less than about 50 mol % of the theoretically necessary amount.

In a second polymerization step, water is added to the reaction slurry so that the total amount of water in the polymerization system is increased to about 7 moles, or to about 5 moles, per mole of the effective amount of the charged alkali metal sulfide. Following, the reaction mixture of the polymerization system can be heated to a temperature of from about 250° C. to about 290° C., from about 255° C. to about 280° C., or from about 260° C. to about 270° C. and the polymerization can continue until the melt viscosity of the thus formed polymer is raised to the desired final level of the polyarylene sulfide. The duration of the second polymerization step can be, e.g., from about 0.5 to about 20 hours, or from about 1 to about 10 hours.

The polyarylene sulfide may be linear, semi-linear, branched or crosslinked. A linear polyarylene sulfide includes as the main constituting unit the repeating unit of —(Ar—S)—. In general, a linear polyarylene sulfide may include about 80 mol % or more of this repeating unit. A linear polyarylene sulfide may include a small amount of a branching unit or a cross-linking unit, but the amount of branching or cross-linking units may be less than about 1 mol % of the total monomer units of the polyarylene sulfide. A linear polyarylene sulfide polymer may be a random copolymer or a block copolymer containing the above-mentioned repeating unit.

A semi-linear polyarylene sulfide may be utilized that may have a cross-linked structure or a branched structure provided by introducing into the polymer a small amount of one or more monomers having three or more reactive functional groups. For instance between about 1 mol % and about 10 mol % of the polymer may be formed from monomers having three or more reactive functional groups. Methods that may be used in making semi-linear polyarylene sulfide are generally known in the art. By way of example, monomer components used in forming a semi-linear polyarylene sulfide can include an amount of polyhaloaromatic compounds having 2 or more halogen substituents per molecule which can be utilized in preparing branched polymers. Such monomers can be represented by the formula $R'X_n$, where each X is selected from chlorine, bromine, and iodine, n is an integer of 3 to 6, and R' is a polyvalent aromatic radical of valence n which can have up to about 4 methyl substituents, the total number of carbon atoms in R' being within the range of 6 to about 16. Examples of some polyhaloaromatic compounds having more than two halogens substituted per molecule that can be employed in forming a semi-linear polyarylene sulfide include 1,2,3-trichlorobenzene, 1,2,4-trichlorobenzene, 1,3-dichloro-5-bromobenzene, 1,2,4-triiodobenzene, 1,2,3,5-tetrabromobenzene, hexachlorobenzene, 1,3,5-trichloro-2,4,6-trimethylbenzene, 2,2',4,4'-tetrachlorobiphenyl, 2,2',5,5'-tetra-iodobiphenyl, 2,2',6,6'-tetrabromo-3,3',5,5'-tetramethylbiphenyl, 1,2,3,4-tetrachloronaphthalene, 1,2,4-tribromo-6-methylnaphthalene, and the like, and mixtures thereof.

The thermoplastic composition may include the polyarylene sulfide component (which also encompasses a blend of polyarylene sulfides) in an amount from about 10 wt. % to about 99 wt. % by weight of the composition, for instance from about 20% wt. % to about 90 wt. % by weight of the composition.

The polyarylene sulfide may be of any suitable molecular weight and melt viscosity, generally depending upon the final application intended for the thermoplastic composition. For instance, the polyarylene sulfide may be a low viscosity polyarylene sulfide, having a melt viscosity of less than about 500 poise, a medium viscosity polyarylene sulfide, having a melt viscosity of between about 500 poise and about 1,500 poise, or a high melt viscosity polyarylene sulfide, having a melt viscosity of greater than about 1,500 poise. Melt viscosity can be determined in accordance with ISO Test No. 11443 at a shear rate of 1200 $s^{-1}$ and at a temperature of 310° C.

According to one embodiment, the polyarylene sulfide can be treated with a disulfide compound. Reaction between the polyarylene sulfide polymer and the disulfide compound can lead to chain scission of the polyarylene sulfide polymer that can decrease melt viscosity of the polyarylene sulfide. In one embodiment, a higher melt viscosity polyarylene sulfide having low halogen content can be utilized as a starting polymer. Following chain scission of the polyarylene sulfide polymer by the disulfide compound, a relatively low melt viscosity polyarylene sulfide with low halogen content can be formed. Following this chain scission, the melt viscosity of the polyarylene sulfide can be decreased and more suitable for desired further processing, and the overall halogen content of the low melt viscosity polyarylene sulfide can be quite low. A polyarylene sulfide composition that exhibits excellent strength and degradation resistance in addition to low halogen content can be advantageous as low halogen content polymeric materials are becoming increasingly desired due to environmental concerns. In one embodiment, the thermoplastic composition can have a halogen content of about 1000 ppm or less, about 900 ppm or less, about 600 ppm or less, or about 400 ppm or less as determined according to an elemental analysis using Parr Bomb combustion followed by Ion Chromatography.

In one embodiment, the disulfide compound that is incorporated into the thermoplastic composition formation process can include reactive functional end-groups, and the polyarylene sulfide can be functionalized in conjunction with formation of the composition. For instance, a disulfide compound containing desired reactive functional groups can be added to the melt extruder in conjunction with the polyarylene sulfide. Functionalization of the polyarylene sulfide can provide sites for bonding between the impact modifier and or the heat stabilizer and the polyarylene sulfide, which can improve distribution of the impact modifier and/or the heat stabilizer throughout the polyarylene sulfide and prevent phase separation.

A disulfide compound can generally have the structure of:

wherein $R^1$ and $R^2$ may be the same or different and can include hydrocarbon groups that independently include from 1 to about 20 carbons. For instance, $R^1$ and $R^2$ may include an alkyl, cycloalkyl, aryl, or heterocyclic group or combinations of hydrocarbon groups.

As discussed above, $R^1$ and/or $R^2$ may include reactive functionality. For example, at least one of $R^1$ and $R^2$ may include a terminal carboxyl group, hydroxyl group, a substituted or non-substituted amino group, a nitro group, or the like. In general, the reactive functionality can be selected such that the reactively functionalized polyarylene sulfide can react with the impact modifier and/or the heat stabilizer. For example, when considering an epoxy-terminated impact modifier and/or heat stabilizer, the disulfide compound can include carboxyl and/or amine functionality.

Examples of disulfide compounds including reactive terminal groups as may be encompassed herein may include, without limitation, 2,2'-diaminodiphenyl disulfide, 3,3'-diaminodiphenyl disulfide, 4,4'-diaminodiphenyl disulfide, dibenzyl disulfide, dithiosalicyclic acid, dithioglycolic acid, α,α'-dithiodilactic acid, 13,13'-dithiodilactic acid, 3,3'-dithiodipyridine, 4,4'dithiomorpholine, 2,2'-dithiobis(benzothiazole), 2,2'-dithiobis(benzimidazole), 2,2'-dithiobis(benzoxazole) and 2-(4'-morpholinodithio)benzothiazole.

Of course, when incorporating a disulfide compound, it need not be reactively functionalized, and the disulfide compound can be utilized merely to provide a low melt viscosity, low halogen content polyarylene sulfide. For instance, the disulfide compound may include nonreactive functionality at terminal end(s). For example, the $R^1$ and $R^2$ groups may be the same or different and may be independently selected from non-functionalized alkyl, cycloalkyl, aryl, and heterocyclic groups of 1 to about 20 carbon atoms. Examples of disulfide compounds including nonreactive terminal groups as may be combined with a polyarylene sulfide in forming a mixture for melt processing may include, without limitation, diphenyl disulfide, naphthyl disulfide, dimethyl disulfide, diethyl disulfide, and dipropyl disulfide.

When a disulfide is included, the ratio of the amount of the polyarylene sulfide to the amount of the disulfide compound can be from about 1000:1 to about 10:1, from about 500:1 to about 20:1, or from about 400:1 to about 30:1.

Functionalization of the polyarylene sulfide can be carried out through reaction with any suitable compound, and is not limited to reaction with a disulfide compound. For instance, a polyarylene sulfide can be further treated following formation with a carboxyl, acid anhydride, amine, isocyanate or other functional group-containing modifying compound to provide a functional terminal group on the polyarylene sulfide. By way of example, a polyarylene sulfide can be reacted with a modifying compound containing a mercapto group and also containing a reactive functional group. In one embodiment, the polyarylene sulfide can be reacted with the modifying compound in an organic solvent. In another embodiment, the polyarylene sulfide can be reacted with the modifying compound in the molten state.

In addition to one or more polyarylene sulfide polymers, the composition also includes an impact modifier. More specifically, the impact modifier can be an olefinic copolymer or terpolymer. For instance, the impact modifier can include ethylenically unsaturated monomer units have from about 4 to about 10 carbon atoms.

In one embodiment, the impact modifier can be modified to include functionalization, for instance so as to react with other components of the composition. For instance, the impact modifier can be modified with a mole fraction of from about 0.01 to about 0.5 of one or more of the following: an α, β unsaturated dicarboxylic acid or salt thereof having from about 3 to about 8 carbon atoms; an α, β unsaturated carboxylic acid or salt thereof having from about 3 to about 8 carbon atoms; an anhydride or salt thereof having from about 3 to about 8 carbon atoms; a monoester or salt thereof having from about 3 to about 8 carbon atoms; a sulfonic acid or a salt thereof; an unsaturated epoxy compound having from about 4 to about 11 carbon atoms. Examples of such modification functionalities include maleic anhydride, fumaric acid, maleic acid, methacrylic acid, acrylic acid, and glycidyl methacrylate. Examples of metallic acid salts include the alkaline metal and transitional metal salts such as sodium, zinc, and aluminum salts.

A non-limiting listing of impact modifiers that may be used include ethylene-acrylic acid copolymer, ethylene-maleic anhydride copolymers, ethylene-alkyl(meth)acrylate-maleic anhydride terpolymers, ethylene-alkyl(meth) acrylate-glycidyl(meth)acrylate terpolymers, ethylene-acrylic ester-methacrylic acid terpolymer, ethylene-acrylic ester-maleic anhydride terpolymer, ethylene-methacrylic acid-methacrylic acid alkaline metal salt (ionomer) terpolymers, and the like. In one embodiment, for instance, an impact modifier can include a random terpolymer of ethylene, methylacrylate, and glycidyl methacrylate. The terpolymer can have a glycidyl methacrylate content of from about 5% to about 20%, such as from about 6% to about 10%. The terpolymer may have a methylacrylate content of from about 20% to about 30%, such as about 24%.

The impact modifier may be a linear or branched, homopolymer or copolymer (e.g., random, graft, block, etc.) containing epoxy functionalization, e.g., terminal epoxy groups, skeletal oxirane units, and/or pendent epoxy groups. For instance, the impact modifier may be a copolymer including at least one monomer component that includes epoxy functionalization. The monomer units of the impact modifier may vary. For example, the impact modifier can include epoxy-functional methacrylic monomer units. As used herein, the term methacrylic generally refers to both acrylic and methacrylic monomers, as well as salts and esters thereof, e.g., acrylate and methacrylate monomers. Epoxy-functional methacrylic monomers as may be incorporated in the impact modifier may include, but are not limited to, those containing 1,2-epoxy groups, such as glycidyl acrylate and glycidyl methacrylate. Other suitable epoxy-functional monomers include allyl glycidyl ether, glycidyl ethacrylate, and glycidyl itoconate.

Other monomer units may additionally or alternatively be a component of the impact modifier. Examples of other monomers may include, for example, ester monomers, olefin monomers, amide monomers, etc. In one embodiment, the impact modifier can include at least one linear or branched α-olefin monomer, such as those having from 2 to 20 carbon atoms, or from 2 to 8 carbon atoms. Specific examples include ethylene; propylene; 1-butene; 3-methyl-1-butene; 3,3-dimethyl-1-butene; 1-pentene; 1-pentene with one or more methyl, ethyl or propyl substituents; 1-hexene with one or more methyl, ethyl or propyl substituents; 1-heptene with one or more methyl, ethyl or propyl substituents; 1-octene with one or more methyl, ethyl or propyl substituents; 1-nonene with one or more methyl, ethyl or propyl substituents; ethyl, methyl or dimethyl-substituted 1-decene; 1-dodecene; and styrene.

Monomers included on an impact modifier that includes epoxy functionalization can include monomers that do not include epoxy functionalization, as long as at least a portion of the monomer units of the polymer are epoxy functionalized.

In one embodiment, the impact modifier can be a terpolymer that includes epoxy functionalization. For instance, the impact modifier can include a methacrylic component that includes epoxy functionalization, an α-olefin component, and a methacrylic component that does not include epoxy functionalization. For example, the impact modifier may be poly(ethylene-co-methylacrylate-co-glycidyl methacrylate), which has the following structure:

wherein, a, b, and c are 1 or greater.

In another embodiment the impact modifier can be a random copolymer of ethylene, ethyl acrylate and maleic anhydride having the following structure:

wherein x, y and z are 1 or greater.

The relative proportion of the various monomer components of a copolymeric impact modifier is not particularly limited. For instance, in one embodiment, the epoxy-functional methacrylic monomer components can form from about 1 wt. % to about 25 wt. %, or from about 2 wt. % to about 20 wt % of a copolymeric impact modifier. An α-olefin monomer can form from about 55 wt. % to about 95 wt. %, or from about 60 wt. % to about 90 wt. %, of a copolymeric impact modifier. When employed, other monomeric components (e.g., a non-epoxy functional methacrylic monomers) may constitute from about 5 wt. % to about 35 wt. %, or from about 8 wt. % to about 30 wt. %, of a copolymeric impact modifier.

An impact modifier may be formed according to standard polymerization methods as are generally known in the art. For example, a monomer containing polar functional groups may be grafted onto a polymer backbone to form a graft copolymer. Alternatively, a monomer containing functional groups may be copolymerized with a monomer to form a block or random copolymer using known free radical polymerization techniques, such as high pressure reactions, Ziegler-Natta catalyst reaction systems, single site catalyst (e.g., metallocene) reaction systems, etc.

Alternatively, an impact modifier may be obtained on the retail market. By way of example, suitable compounds for use as an impact modifier may be obtained from Arkema under the name Lotader®.

The molecular weight of the impact modifier can vary widely. For example, the impact modifier can have a number average molecular weight from about 7,500 to about 250,000 grams per mole, in some embodiments from about 15,000 to about 150,000 grams per mole, and in some embodiments, from about 20,000 to 100,000 grams per mole, with a polydispersity index typically ranging from 2.5 to 7.

The impact modifier may be present in the composition in a relatively large amount. For instance, the impact modifier can be present in an amount of 15% or greater of the thermoplastic composition, for instance from 15% to about 40% by weight, from about 18% to about 37% by weight, or from about 20% to about 35% by weight in some embodiments.

The thermoplastic composition also contains a heat stabilizer. By way of example, in one embodiment the heat stabilizer can be a phosphite stabilizer. A phosphite stabilizer can, when combined with a relatively high add-in level of the impact modifier, improve the heat stability of the thermoplastic composition. For instance, the composition can maintain flexibility when utilized in applications that involve increased temperature, and in particular in wire and cable coating applications. In addition, the composition can exhibit reduced yellowing or darkening as compared to other thermoplastic compositions.

The phosphite stabilizer can include an organic phosphite. For example, phosphite stabilizers that are encompassed herein include phosphites capable of withstanding higher temperatures, especially temperatures to which the thermoplastic composition can be subjected to during use. For example, phosphite stabilizers can include monophosphites and diphosphites wherein the diphosphite has a molecular configuration that inhibits the absorption of moisture and/or has a relatively high Spiro isomer content. For instance, a diphosphite stabilizer may be selected that has a Spiro isomer content of greater than 90%, such as greater than 95%, such as greater than 98%.

Non-limiting examples of phosphite stabilizers include bis(2,4-dicumylphenyl)pentaerythritol diphosphite, bis(2,4-di-t-butylphenyl)pentaerythritol diphosphite, distearyl pentaerythritol diphosphite, mixtures thereof, and the like.

The phosphite stabilizer, tris(2,4-di-tert-butylphenyl) phosphite, may be represented by the following structure:

The phosphite stabilizer, bis(2,4-dicumylphenyl)pentaerythritol diphosphite, may be represented by the following structure:

The phosphite stabilizer, distearyl pentaerythritol diphosphite, may be represented by the following structure:

wherein R' is an alkyl group or an aryl group and the two R' groups may be the same or different.

The thermoplastic composition may generally include the heat stabilizer in an amount of about 0.05 wt. % or greater, for instance from about 0.1 wt. % to about 3 wt. % by weight of the composition, from about 0.2 wt. % to about 2 wt. % by weight of the composition in some embodiments.

In another embodiment, components of the thermoplastic composition can be crosslinked to one another by use of a crosslinking agent. For instance, the impact modifier can be crosslinked, the heat stabilizer can be crosslinked to the impact modifier and/or the impact modifier can be crosslinked to the polyarylene sulfide by use of a crosslinking agent that is included in the thermoplastic composition during formation.

When included, the crosslinking agent can be a polyfunctional compound that can react with functionality of one or more of the impact modifier, the polyarylene sulfide, and the heat stabilizer to form crosslinks within and among the components of the thermoplastic composition. In general, the crosslinking agent can be a non-polymeric compound, i.e., a molecular compound that includes two or more reactively functional terminal moieties linked by a bond or a non-polymeric (non-repeating) linking component. By way of example, the crosslinking agent can include but is not limited to di-epoxides, poly-functional epoxides, diisocyanates, polyisocyanates, polyhydric alcohols, water-soluble carbodiimides, diamines, diaminoalkanes, polyfunctional carboxylic acids, diacid halides, and so forth. For instance, when considering an epoxy-functional impact modifier, a non-polymeric polyfunctional carboxylic acid or amine can be utilized as a crosslinking agent.

Specific examples of polyfunctional carboxylic acid crosslinking agents can include, without limitation, isophthalic acid, terephthalic acid, phthalic acid, 1,2-di(p-carboxyphenyl)ethane, 4,4'-dicarboxydiphenyl ether, 4,4'-bisbenzoic acid, 1,4- or 1,5-naphthalene dicarboxylic acids, decahydronaphthalene dicarboxylic acids, norbornene dicarboxylic acids, bicyclooctane dicarboxylic acids, 1,4-cyclohexanedicarboxylic acid (both cis and trans), 1,4-hexylenedicarboxylic acid, adipic acid, azelaic acid, dicarboxyl dodecanoic acid, succinic acid, maleic acid, glutaric acid, suberic acid, azelaic acid and sebacic acid. The corresponding dicarboxylic acid derivatives, such as carboxylic acid diesters having from 1 to 4 carbon atoms in the alcohol radical, carboxylic acid anhydrides or carboxylic acid halides may also be utilized.

Exemplary diols useful as crosslinking agents can include, without limitation, aliphatic diols such as ethylene glycol, 1,2-propylene glycol, 1,3-propylene glycol, 2,2-dimethyl-1,3-propane diol, 2-ethyl-2-methyl-1,3-propane diol, 1,4-butane diol, 1,4-but-2-ene diol, 1,3-1,5-pentane diol, 1,5-pentane diol, dipropylene glycol, 2-methyl-1,5-pentane diol, and the like. Aromatic diols can also be utilized such as, without limitation, hydroquinone, catechol, resorcinol, methylhydroquinone, chlorohydroquinone, bisphenol A, tetrachlorobisphenol A, phenolphthalein, and the like. Exemplary cycloaliphatic diols as may be used include a cycloaliphatic moiety, for example 1,6-hexane diol, dimethanol decalin, dimethanol bicyclooctane, 1,4-cyclohexane dimethanol (including its cis- and trans-isomers), triethylene glycol, 1,10-decanediol, and the like.

Exemplary diamines that may be utilized as crosslinking agents can include, without limitation, isophorone-diamine, ethylenediamine, 1,2-, 1,3-propylene-diamine, N-methyl-1, 3-propylene-diamine, N,N'-dimethyl-ethylenediamine, and aromatic diamines, such as, for example, 2,4- and 2,6-toluoylene-diamine, 3,5-diethyl-2,4- and/or -2,6-toluoylenediamine, and primary ortho- di-, tri- and/or tetra-alkyl-substituted 4,4'-diaminodiphenyl-methanes, (cyclo)aliphatic diamines, such as, for example, isophorone-diamine, ethylenediamine, 1,2-, 1,3-propylene-diamine, N-methyl-1,3-propylene-diamine, N,N'-dimethyl-ethylenediamine, and aromatic diamines, such as, for example, 2,4- and 2,6-toluoylene-diamine, 3,5-diethyl-2,4- and/or -2,6-toluoylenediamine, and primary ortho- di-, tri- and/or tetra-alkyl-substituted 4,4'-diaminodiphenyl-methanes.

Halogen-containing compounds (e.g., polyarylenes of the composition) may be crosslinked by their reaction with metal oxides. Examples of useful metal oxides include, but are not limited to, zinc oxide, calcium oxide, and lead oxide. The metal oxide can be used alone or in conjunction with its corresponding metal fatty acid complex (e.g., zinc stearate, calcium stearate, etc.), or with the organic and fatty acids added alone, such as stearic acid, and optionally other curatives, such as sulfur or a sulfur compound, an alkylperoxide compound, diamines, or derivatives thereof.

Metal compounds including metal oxides and/or metal salts of fatty acids may be utilized in crosslinking other components of the thermoplastic composition, in addition to or alternative to halogen-containing compounds. For instance, metal containing compounds can react with functional groups of the impact modifier (e.g., epoxide groups) to crosslink the impact modifier with itself and/or with other components of the thermoplastic composition. A fatty acid metal salt can be, for example, an alkali metal salt or alkali earth metal salt of a fatty acid having 6 to 40 carbon atoms, as exemplified by calcium stearate, sodium montanate and calcium montanate, without limitation thereto.

When, present, the thermoplastic composition may generally include the crosslinking agent in an amount of about 3 wt. % or less, for instance from about 0.05 wt. % to about 2 wt. % by weight of the composition, from about 0.07 wt. % to about 1.5 wt. % by weight of the composition, or from about 0.1 wt. % to about 1.3 wt. % of the composition.

The composition can also include one or more additives as are generally known in the art. For example, optionally, the thermoplastic composition can include one or more additional polymers. Siloxane polymers may be particular beneficial as, in one embodiment, a siloxanes polymer can function as a flame retardant. For instance, in one embodiment the thermoplastic composition can also include a siloxane polymer. The siloxane polymer can encompass any polymer, co-polymer or oligomer that includes siloxane units in the backbone having the formula:

wherein $R_3$ and $R_4$ are independently of one another, hydrogen, alkyl, alkenyl, acyl, alkaryl or aralkyl having up to 20 carbon atoms. In one embodiment the siloxane polymer includes reactive functionality on at least a portion of the siloxane monomer units of the polymer. The backbone of the siloxane polymer can include substitutions as is known in the art such as alkyl substitutions, phenyl substitutions, etc.

Some examples of suitable siloxane polymers include, without limitation, polydimethyl siloxanes such as dimethylvinylsiloxy end group-capped polydimethyl siloxane, methyldivinylsiloxy end group-capped polydimethyl siloxane, dimethylvinylsiloxy end group-capped dimethyl siloxane, (80 mol %)/methylphenylsiloxane (20 mol %) copolymers, dimethylvinylsiloxy end group-capped dimethylsiloxane (80 mol %)/diphenylsiloxane (20 mol %) copolymers, dimethylvinylsiloxy end group-capped dimethylsiloxane (90 mol %)/diphenylsiloxane (10 mol %) copolymers, and trimethylsiloxy end group-capped dimethylsiloxane/methylvinylsiloxane copolymers. Besides the above-mentioned polymers, other polymers may also be utilized. For instance, some suitable vinyl-modified silicones include, but are not limited to, vinyldimethyl terminated polydimethylsiloxanes; vinylmethyl, dimethylpolysiloxane copolymers; vinyldimethyl terminated vinylmethyl, dimethylpolysiloxane copolymers; divinylmethyl terminated polydimethylsiloxanes; polydimethylsiloxane, mono vinyl, mono n-butyldimethyl terminated; and vinylphenyl-methyl terminated polydimethylsiloxanes. Further, some methyl-modified silicones that can be used include, but are not limited to, dimethylhydro terminated polydimethylsiloxanes; methylhydro, dimethylpolysiloxane copolymers; methylhydro terminated methyloctyl siloxane copolymers; and methylhydro, phenylmethyl siloxane copolymers.

When included, the reactive functionality of the siloxane polymer can include, without limitation, one or more of vinyl groups, hydroxyl groups, hydrides, isocyanate groups, epoxy groups, acid groups, halogen atoms, alkoxy groups (e.g., methoxy, ethoxy and propoxy), acyloxy groups (e.g., acetoxy and octanoyloxy), ketoximate groups (e.g., dimethylketoxime, methylketoxime and methylethylketoxime), amino groups (e.g., dimethylamino, diethylamino and butylamino), amido groups (e.g., N-methylacetamide and N-ethylacetamide), acid amido groups, amino-oxy groups, mercapto groups, alkenyloxy groups (e.g., vinyloxy, isopropenyloxy, and 1-ethyl-2-methylvinyloxy), alkoxyalkoxy groups (e.g., methoxyethoxy, ethoxyethoxy and methoxypropoxy), aminoxy groups (e.g., dimethylaminoxy and diethylaminoxy), mercapto groups, and the like.

The siloxane polymer can have any desired molecular weight. For example, in one embodiment, the siloxane polymer can have a molecular weight of greater than about 5000 Daltons. In one embodiment, a high molecular weight siloxane polymer can be incorporated in the thermoplastic composition, e.g., a high molecular weight polydimethylsiloxane that can have more than about 200 —$(CH_3)_2SiO$— repeating units along the backbone. In another embodiment, an ultrahigh molecular weight siloxane polymer, e.g., an ultrahigh molecular weight polydimethylsiloxane can be incorporated in the thermoplastic composition that can have a number average molecular weight of about $10^6$ grams per mole or greater.

In one embodiment, the siloxane polymer can be epoxy-functionalized and can include epoxy groups incorporated into the siloxane polymer having the formula:

wherein $R_5$ is a divalent aliphatic ($C_1$-$C_{10}$), cycloalkyl($C_5$-$C_{20}$) heterocyclic ($C_4$-$C_9$), substituted or unsubstituted aromatic ($C_6$-$C_9$) hydrocarbon radical or a direct bond.

The epoxy groups can be incorporated onto an amine-functionalized or amino-terminated siloxane. For instance, an amine-terminated siloxane polymer such as those available commercially as the "G series" siloxane resins available from the General Electric Company can be reactively functionalized with epoxy. Epoxy functionalization may be carried out via reaction with an epoxy-containing compound such as an epoxy chlorotriazine as is known.

One example of a suitable epoxy chlorotriazine as may be utilized is trimethylglycidyl cyanuric chloride.

A siloxane polymer can be mercapto-functionalized and can include mercapto groups incorporated into the siloxane polymer having the formula:

wherein $R_5$ is as described above. For example, the siloxane polymer can be a mercapto-functionalized polydimethyl siloxane having the general formula:

When incorporated in the thermoplastic composition, the composition can include a siloxane polymer in an amount of about 40 wt. % or less of the thermoplastic composition. For instance, the thermoplastic composition can include a siloxane polymer in an amount of from about 0.05 wt. % to about 35 wt. %, or about 0.1 wt. % to about 30 wt. %.

When a siloxane polymer is including, in one embodiment, the thermoplastic composition can include fumed silica in combination with the siloxane polymer. Fumed silica can generally have a particle size of from about 5 nanometers to about 50 nanometers. The particles are non-porous and can have a surface area of from about 50 square meters per gram ($m^2/g$) to about 600 $m^2/g$ and a density of from about 160 kilogram per cubic meter ($kg/m^3$) to about 190 $kg/m^3$. When incorporated in the thermoplastic composition, the composition can include fumed silica in an about of less than about 25 wt. %, for instance from about 0.05 wt % to about 20 wt. %. In one embodiment, the fumed silica can be combined with the siloxane polymer prior to addition of this mixture to the thermoplastic composition. For instance a mixture including an ultrahigh molecular weight polydimethylsiloxane and fumed silica can be incorporated in the thermoplastic composition. Such a pre-formed mixture is available as Genioplast® from Wacker Chemie, AG.

One or more fillers can be included in the thermoplastic composition in one embodiment. When included, one or more fillers may be incorporated in the composition an amount of from about 5 wt. % to about 70 wt. %, or from about 20 wt. % to about 65 wt. % by weight of the polyarylene sulfide composition.

In one embodiment, a fibrous filler can be included in the thermoplastic composition. The fibrous filler may include one or more fiber types including, without limitation, polymer fibers, glass fibers, carbon fibers, metal fibers, basalt fibers, and so forth, or a combination of fiber types. In one embodiment, the fibers may be chopped fibers, continuous fibers, or fiber rovings (tows).

Fiber sizes can vary as is known in the art. In one embodiment, the fibers can have an initial length of from about 3 mm to about 5 mm. In another embodiment, for instance when considering a pultrusion process, the fibers can be continuous fibers. Fiber diameters can vary depending upon the particular fiber used. The fibers, for instance, can have a diameter of less than about 100 µm, such as less than about 50 µm. For instance, the fibers can be chopped or continuous fibers and can have a fiber diameter of from about 5 µm to about 50 µm, such as from about 5 µm to about 15 µm.

The fibers may be pretreated with a sizing as is generally known. In one embodiment, the fibers may have a high yield or small K numbers. The tow is indicated by the yield or K number. For instance, glass fiber tows may have 50 yield and up, for instance from about 115 yield to about 1200 yield.

Other fillers can alternatively be utilized or may be utilized in conjunction with a fibrous filler. For instance, a particulate filler can be incorporated in the thermoplastic composition. In general, particulate fillers can encompass any particulate material having a median particle size of less than about 750 µm, for instance less than about 500 µm, or less than about 100 µm. In one embodiment, a particulate filler can have a median particle size in the range of from about 3 µm to about 20 µm. In addition, a particulate filler can be solid or hollow, as is known. Particulate fillers can also include a surface treatment, as is known in the art.

Particulate fillers can encompass one or more mineral fillers. For instance, the thermoplastic composition can include one or more mineral fillers in an amount of from about 1 wt. % to about 60 wt. % of the composition. Mineral fillers may include, without limitation, silica, quartz powder, silicates such as calcium silicate, aluminum silicate, kaolin, talc, mica, clay, diatomaceous earth, wollastonite, calcium carbonate, and so forth.

Other additives that can be included in the polyarylene sulfide composition can encompass, without limitation, suitable UV stabilizers such as UV absorbers, such as benzotriazoles or benzopheones that can absorb UV radiation, colorants, dyes, pigments, antimicrobials, lubricants (e.g., Glycolube® available from Lonza Group Ltd.), surfactants, flow promoters, solid solvents, and other materials added to enhance properties and processability. Such optional materials may be employed in the thermoplastic composition in conventional amounts and according to conventional processing techniques, for instance through addition to the thermoplastic composition at the main feed throat. Beneficially, the thermoplastic composition can exhibit desirable characteristics without the addition of plasticizers. For instance, the composition can be free of plasticizers such as phthalate esters, trimellitates, sebacates, adipates, gluterates, azelates, maleates, benzoates, and so forth.

Figure 1:
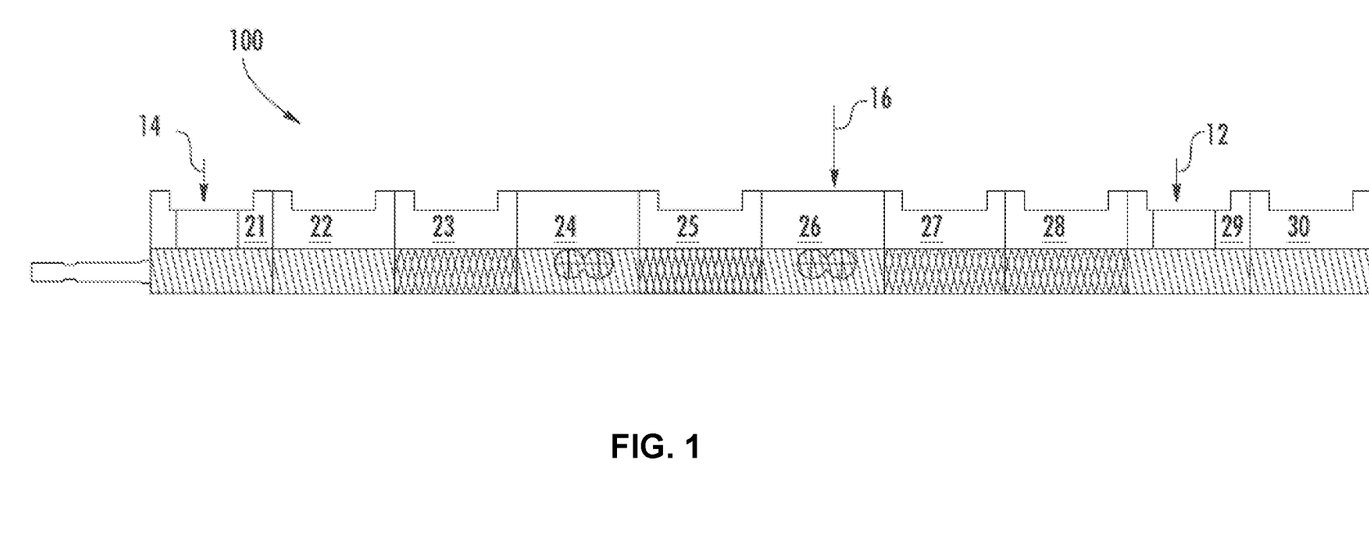
FIG. 1 is a schematic representation of a process for forming a thermoplastic composition as disclosed herein.

FIG. 1 schematically illustrates a process that can be used in forming the thermoplastic composition. As illustrated, the components of the composition may be melt-kneaded in a melt processing unit such as an extruder 100. Extruder 100 can be any extruder as is known in the art including, without limitation, a single, twin, or multi-screw extruder, a co-rotating or counter rotating extruder, an intermeshing or non-intermeshing extruder, and so forth. In one embodiment, the composition may be melt processed in an extruder 100 that includes multiple zones or barrels. In the illustrated embodiment, extruder 100 includes 10 barrels numbered 21-30 along the length of the extruder 100, as shown. Each barrel 21-30 can include feed lines 14, 16, vents 12, temperature controls, etc. that can be independently operated. A general purpose screw design can be used to melt process the thermoplastic composition. By way of example, a composition may be melt mixed using a twin screw extruder such as a Coperion co-rotating fully intermeshing twin screw extruder.

In forming a thermoplastic composition, the polyarylene sulfide can be fed to the extruder 100 at a main feed throat 14. For instance, the polyarylene sulfide may be fed to the main feed throat 14 at the first barrel 21 by means of a metering feeder. The polyarylene sulfide can be melted and mixed with the other components of the composition as it progresses through the extruder 100.

The impact modifier and the heat stabilizer can be added to the composition in conjunction with the polyarylene sulfide at the main feed throat 14 or downstream of the main feed throat, as desired. For instance, the impact modifier and/or the heat stabilizer may be added at a location downstream from the point at which the polyarylene sulfide is supplied to the melt processing unit, but yet prior to the melting section, i.e., that length of the melt processing unit in which the polyarylene sulfide becomes molten. In another embodiment, the impact modifier and/or the heat stabilizer may be added at a location downstream from the point at which the polyarylene sulfide becomes molten.

If desired, one or more distributive and/or dispersive mixing elements may be employed within the mixing section of the melt processing unit. Suitable distributive mixers for single screw extruders may include but are not limited to, for instance, Saxon, Dulmage, Cavity Transfer mixers, etc. Likewise, suitable dispersive mixers may include but are not limited to Blister ring, Leroy/Maddock, CRD mixers, etc. As is well known in the art, the mixing may be further improved by using pins in the barrel that create a folding and reorientation of the polymer melt, such as those used in Buss Kneader extruders, Cavity Transfer mixers, and Vortex Intermeshing Pin mixers.

Following addition of all components to the mixer, the thermoplastic composition is thoroughly mixed in the remaining section(s) of the extruder and extruded through a die. The final extrudate can be pelletized or otherwise shaped as desired.

Conventional shaping processes can be used for forming articles out of the thermoplastic composition including, without limitation, extrusion, injection molding, blow-molding, thermoforming, foaming, compression molding, hot-stamping, fiber spinning, pultrusion and so forth.

Figure 2:
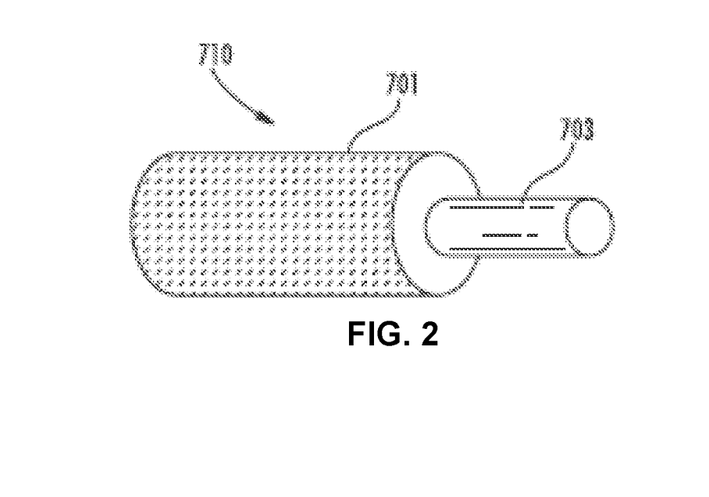
FIG. 2 illustrates a sheathed wire that may be made in accordance with the present disclosure.
Figure 3:
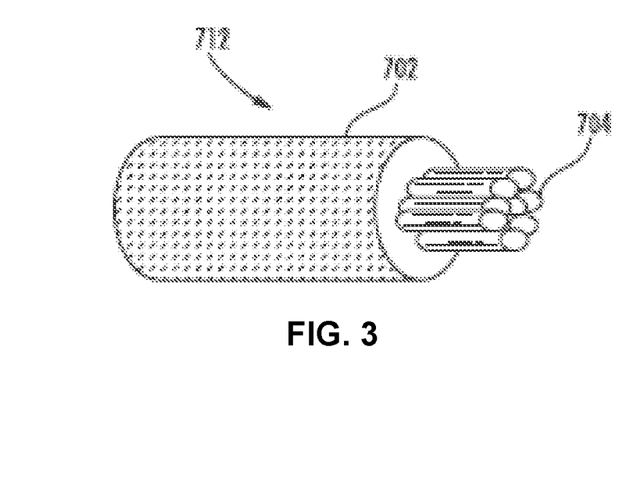
FIG. 3 illustrates a sheathed cable that may be made in accordance with the present disclosure.

In one embodiment, the composition may be employed in forming an electronic component such as a wire or a cable. For example, and as illustrated in FIG. 2 and FIG. 3, the thermoplastic composition can be utilized to form sheathing 701 around a wire 703 or sheathing 702 around a cable 704 for protection and encasement purposes. For instance, the thermoplastic composition can be extruded by use of a sheathing machine around a wire or cable to form the protecting coating on the external surface of the wire/cable.

Embodiments of the present disclosure are illustrated by the following examples that are merely for the purpose of illustration of embodiments and are not to be regarded as limiting the scope of the invention or the manner in which it may be practiced. Unless specifically indicated otherwise, parts and percentages are given by weight.

Formation and Test Methods

Injection Molding Process: Tensile bars are injection molded to ISO 527-1 specifications according to standard ISO conditions.

Melt Viscosity: The melt viscosity (Pa-s) was determined in accordance with ISO Test No. 11443 at 350° C. and at a shear rate of 400 s$^{-1}$ and 1000 s$^{-1}$ using a Dynisco 7001 capillary rheometer. The rheometer orifice (die) had a diameter of 1 mm, length of 20 mm, L/D ratio of 20.1, and an entrance angle of 180°. The diameter of the barrel was 9.55 mm±0.005 mm and the length of the rod was 233.4 mm.

Tensile Properties: Tensile properties including tensile modulus, yield stress, yield strain, strength at break, elongation at yield, elongation at break, etc. are tested according to ISO Test No. 527 (technically equivalent to ASTM D638). Modulus, strain, and strength measurements are made on the same test strip sample having a length of 80 mm, thickness of 10 mm, and width of 4 mm. The testing temperature is 23° C., and the testing speeds were 50 mm/min.

Notched Charpy Impact Strength: Notched Charpy properties are tested according to ISO Test No. ISO 179-1) (technically equivalent to ASTM D256, Method B). This test is run using a Type A notch (0.25 mm base radius) and Type 1 specimen size (length of 80 mm, width of 10 mm, and thickness of 4 mm). Specimens are cut from the center of a multi-purpose bar using a single tooth milling machine. The testing temperature is 23° C., −30° F., or −40° F. as reported below.

Heat aging: Samples were placed in an oven set to the desired temperature and aged for the desired time. Samples were removed and tested as needed after the being at temperature for the desired length of time.

Deflection Temperature Under Load ("DTUL"): The deflection under load temperature was determined in accordance with ISO Test No. 75-2 (technically equivalent to ASTM D648-07). More particularly, a test strip sample having a length of 80 mm, thickness of 10 mm, and width of 4 mm was subjected to an edgewise three-point bending test in which the specified load (maximum outer fibers stress) was 1.8 Megapascals. The specimen was lowered into a silicone oil bath where the temperature is raised at 2° C. per minute until it deflects 0.25 mm (0.32 mm for ISO Test No. 75-2).

Flexural Properties: Flexural properties are tested according to ISO Test No. 178 (technically equivalent to ASTM D790). This test is performed on a 64 mm support span. Tests are run on the center portions of uncut ISO 3167 multi-purpose bars. The testing temperature is 23° C. and the testing speed is 2 mm/min.

VICAT softening temperature: Vicat Softening temperature was determined according to method A, with a load of 10 N and according to method B with a load of 50 N as described in ISO Test No. 306 (technically equivalent to ASTM D1525), both of which utilized a heating rate of 50 K/h.

EXAMPLE 1

Materials utilized to form the compositions included the following:

Polyarylene sulfide: Fortron® 0214 linear polyphenylene sulfide available from Ticona Engineering Polymers Impact Modifier: LOTADER® AX8840—available from Arkema, Inc.

Heat Stabilizer: Dovorphos® OP 9228 available from Dover Chemical Corporation

Additives: Glycolube® P available from Lonza Group Ltd. MB50-314 Masterbatch available from Dow Corning®

Compositions of the samples are provided in the table, below. Amounts are provided as weight percentages based upon the weight of the sample.

| Component | Comparative Sample | Sample 1 | Sample 2 |
|---|---|---|---|
| Polyarylene Sulfide | 84.7 | 78.4 | 83.4 |
| Impact Modifier | 15 | 20 | 15 |
| Heat Stabilizer | — | 0.3 | 0.3 |
| Lubricant | 0.3 | 0.3 | 0.3 |
| Siloxane Polymer | — | 1.0 | 1.0 |
| Total | 100 | 100 | 100 |

Following formation, samples were tested (including two different formulations of Sample 1) for a variety of physical characteristics. Results are provided in the table, below.

| Characteristic | Comparative Sample | Sample 1 | Sample 2 |
|---|---|---|---|
| Melt Viscosity (poise) | — | — | 4166 |
| Tensile Modulus (MPa) | 2800 | 1900 | 2090 |
| Tensile Stress at Break (MPa) | 50 | 42 | 44.87 |
| Tensile Strain at Break (%) | 25 | 42 | 30.52 |
| Notched Charpy Impact 23° C. (kJ/m$^2$) | 30.0 | 47.8 | 53.4 |
| Notched Charpy Impact - −30° C. (kJ/m$^2$) | — | — | 24.6 |
| Flex Modulus (MPa) | — | — | 2182 |

-continued

| Characteristic | Comparative Sample | Sample 1 | Sample 2 |
|---|---|---|---|
| Flex Stress @3.5% (MPa) | — | — | 65.18 |
| DTUL | — | — | 95 |
| VICAT softening temperature (50° C./hr, 50N) | — | — | 130 |

Figure 4A:
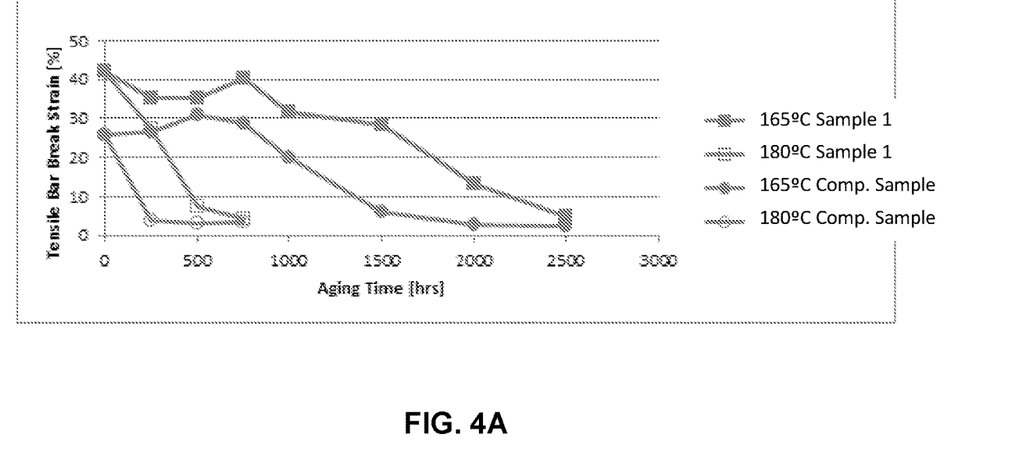
FIG. 4A presents the change in break strain over time as tensile bars formed of the thermoplastic composition and a comparison thermoplastic composition were held at heat aging temperatures of 180° C. and 165° C.

Heat aging of samples was carried out on tensile bars formed of the Comparative Sample and the Sample 1. Results are shown in FIG. 4A. As can be seen in FIG. 4A, the Comparative Sample break strain fell below 10% in less than 250 hours upon heat aging at 180° C., while Sample 1 formed of the thermoplastic composition remained above 10% tensile break strain for about 500 hours. At 165° C., by 1500 hours, the Comparative Sample had fallen to about 5%, while the break strain of Sample 1 formed of the thermoplastic composition remained above 25% and was decreasing at a slow rate.

Figure 4B:
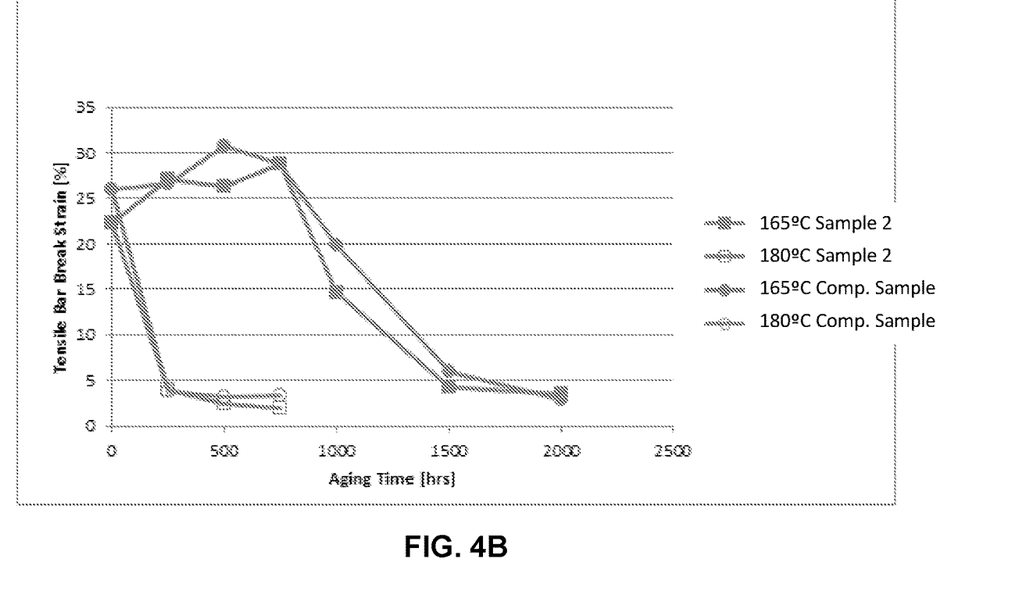
FIG. 4B presents the change in break strain over time for tensile bars formed of a second thermoplastic composition and a comparison thermoplastic composition in a heat aging example.

FIG. 4B illustrates the comparative heat aging results of the comparative sample and Sample 2. As can be seen, the addition of heat stabilizer alone did not improve the heat aging characteristics, while heat stabilizer addition in conjunction with the high impact modifier amount did improve the long term heat aging as compared to the Comparative Sample.

Figure 5:
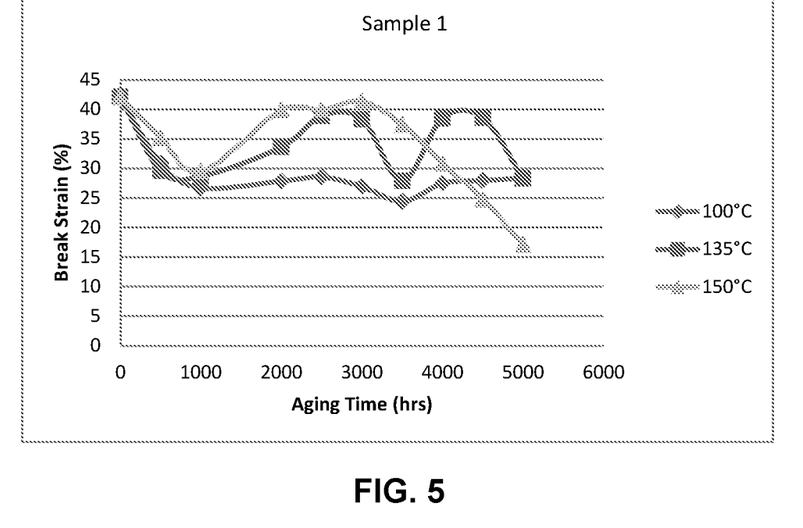
FIG. 5 presents the change in break strain with aging time for a thermoplastic composition at several different temperatures.

FIG. 5 illustrates the change in break strain with aging time for Sample 1 at several different temperatures.

EXAMPLE 2

Materials utilized to form the compositions included the following:

Polyarylene sulfide: Fortron® 0214 linear polyphenylene sulfide available from Ticona Engineering Polymers Impact Modifier: LOTADER® AX8840—available from Arkema, Inc.

Heat Stabilizer: Dovorphos® OP 9228 available from Dover Chemical Corporation

Additives: Glycolube® P available from Lonza Group Ltd. MB50-314 Masterbatch available from Dow Corning®

Crosslinking Agent: Terephthalic acid

Zink stearate

Compositions of the samples are provided in the table, below. Amounts are provided as weight percentages based upon the weight of the sample.

| Component | Sample 3 | Sample 4 | Sample 5 |
|---|---|---|---|
| Polyarylene Sulfide | 83.40 | 84.40 | 83.40 |
| Impact Modifier | 15.00 | 15.00 | 15.00 |
| Heat Stabilizer | 0.30 | 0.30 | 0.30 |
| Lubricant | 0.30 | — | — |
| Siloxane Polymer | 1.00 | — | 1.00 |
| Crosslinking Agent | — | 0.30 | 0.30 |
| Total | 100.0 | 100.0 | 100.0 |

Following formation, samples were tested for a variety of physical characteristics. Results are provided in the table, below.

| Characteristic | Sample 3 | Sample 4 | Sample 5 |
|---|---|---|---|
| Melt Viscosity (poise) | 3125 | 4711 | 5211 |
| Tensile Modulus (MPa) | 2239 | 2311 | 2242 |
| Tensile Stress at Break (MPa) | 46.01 | 48.53 | 48.69 |
| Tensile Strain at Break (%) | 25.45 | 30.59 | 37.55 |
| Notched Charpy Impact 23° C. (kJ/m$^2$) | 38.2 | 56.6 | 54.6 |
| Notched Charpy Impact - −30° C. (kJ/m$^2$) | 11.7 | 38.4 | 25.9 |
| Flex Modulus (MPa) | 2321 | 2361 | 2307 |
| Flex Stress @3.5% (MPa) | 71.59 | 72.01 | 69.76 |
| DTUL | — | 98 | — |
| VICAT softening temperature (50° C./hr, 50N) | — | 160 | — |

As can be seen, crosslinking of the thermoplastic composition offers improvements to the thermoplastic composition, the addition of crosslinking in conjunction with high levels of impact modifier is expected to offer additional improvement.

These and other modifications and variations to the present disclosure may be practiced by those of ordinary skill in the art, without departing from the spirit and scope of the present disclosure. In addition, it should be understood the aspects of the various embodiments may be interchanged, either in whole or in part. Furthermore, those of ordinary skill in the art will appreciate that the foregoing description is by way of example only, and is not intended to limit the disclosure.

What is claimed is:

1. A thermoplastic composition including a polyarylene sulfide, an epoxy-functionalized impact modifier, a heat stabilizer and an ultrahigh molecular weight siloxane polymer, wherein the impact modifier is crosslinked to itself, the heat stabilizer, and/or the polyarylene sulfide by a crosslinker, the crosslinker comprising a metal salt of a fatty acid, the crosslinker further comprising a polyfunctional carboxylic acid, a diol, or a diamine, wherein the thermoplastic composition includes the impact modifier in an amount that is from 15% to 40% by weight of the thermoplastic composition and includes the heat stabilizer in an amount that is from 0.05% to 3% by weight of the thermoplastic composition, the thermoplastic composition having a tensile modulus of about 3,000 megapascals or less as determined according to ISO Test No. 527 at a temperature of 23° C. and a test speed of 50 millimeters per minute.

2. The thermoplastic composition of claim 1, wherein the heat stabilizer is a phosphite stabilizer.

3. The thermoplastic composition of claim 1, wherein the thermoplastic composition has a tensile strain at break of about 40% or greater as determined according to ISO Test No. 527 at a temperature of 23° C. and a test speed of 50 mm/min.

4. The thermoplastic composition of claim 1, wherein the thermoplastic composition has a tensile strain at break of about 10% or greater as determined according to ISO Test No. 527 at a temperature of 23° C. and a test speed of 50 mm/min following heat treatment for 500 hours at a temperature of 180° C.

5. The thermoplastic composition of claim 1, wherein the thermoplastic composition has a tensile strain at break of about 25% or greater as determined according to ISO Test No. 527 at a temperature of 23° C. and a test speed of 50 mm/min following heat treatment for 1500 hours at a temperature of 165° C.

6. The thermoplastic composition of claim 1, wherein the thermoplastic composition has a notched Charpy impact strength of about 10 kilojoules per square meter or greater as determined according to ISO Test No. 179-1 at 23° C.

7. The thermoplastic composition of claim 1, wherein the polyarylene sulfide is a polyphenylene sulfide.

8. The thermoplastic composition of claim 1, wherein the polyarylene sulfide is a linear polyarylene sulfide.

9. The thermoplastic composition of claim 1, wherein the impact modifier is an olefinic copolymer or terpolymer.

10. The thermoplastic composition of claim 9, wherein the impact modifier is a terpolymer.

11. The thermoplastic composition of claim 1, wherein the heat stabilizer is an organic phosphite.

12. The thermoplastic composition of claim 1, further comprising silica.

13. The thermoplastic composition of claim 1, further comprising a lubricant.

14. The thermoplastic composition of claim 1, wherein the crosslinker comprises a polyfunctional carboxylic acid.

15. A shaped product comprising the thermoplastic composition of claim 1.

16. The shaped product of claim 15, wherein the shaped product is an extruded product, an injection molded product, a blow-molded product, a thermoformed product, or a compression molded product.

17. The shaped product of claim 16, wherein the shaped product is an electrical component.

18. The shaped product of claim 17, wherein the electrical component is a sheathed wire or a sheathed cable.

19. The thermoplastic composition of claim 1, wherein the metal salt of a fatty acid comprises an alkali metal salt or an alkali earth metal salt of a fatty acid having 6 to 40 carbon atoms.

20. The thermoplastic composition of claim 1, wherein the metal salt of a fatty acid comprises an alkali metal salt or an alkali earth metal salt of stearic acid.

21. The thermoplastic composition of claim 1, wherein the metal salt of a fatty acid comprises calcium stearate, zinc stearate, sodium montanate, or calcium montanate.

22. The thermoplastic composition of claim 1, wherein the siloxane polymer has a molecular weight of about $10^6$ grams per mole or greater.

23. The thermoplastic composition of claim 1, wherein the composition includes the ultrahigh molecular weight siloxane polymer in an amount that is from 0.05% by weight to 35% by weight.

24. The thermoplastic composition of claim 1, wherein the thermoplastic composition has a tensile strain at break of from about 25% to about 40% as determined according to ISO Test No. 527 at a temperature of 23° C. and a test speed of 50 mm/min.

* * * * *